United States Patent
Tornes et al.

(10) Patent No.: US 6,683,876 B1
(45) Date of Patent: *Jan. 27, 2004

(54) PACKET SWITCHED ROUTER ARCHITECTURE FOR PROVIDING MULTIPLE SIMULTANEOUS COMMUNICATIONS

(75) Inventors: James E. Tornes, Menlo Park, CA (US); Steven C. Miller, Livermore, CA (US); Daniel Yau, Los Altos, CA (US); Jamie Riotto, Montara, CA (US)

(73) Assignee: Silicon Graphics, Inc., Mountain view, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,580

(22) Filed: Sep. 23, 1996

(51) Int. Cl.[7] ............................................. H04L 12/56
(52) U.S. Cl. ................... 370/395.1; 370/401; 370/465; 709/238
(58) Field of Search ................. 370/353, 401, 370/389, 392, 362, 363, 415, 416, 413, 395.1, 276, 294, 352, 360, 390, 400, 432, 465; 709/238, 241

(56) References Cited

U.S. PATENT DOCUMENTS

| | | | | |
|---|---|---|---|---|
| 4,885,739 A | * | 12/1989 | Read et al. ................ | 370/58.1 |
| 5,051,982 A | * | 9/1991 | Brown et al. .............. | 370/58.2 |
| 5,088,091 A | * | 2/1992 | Schroeder et al. ......... | 370/94.3 |
| 5,179,669 A | * | 1/1993 | Peters ........................ | 395/325 |
| 5,218,602 A | * | 6/1993 | Grant et al. ................ | 370/58.2 |
| 5,274,631 A | * | 12/1993 | Bhardwaj ................... | 370/401 |
| 5,287,535 A | * | 2/1994 | Sakagawa et al. ........... | 370/60 |
| 5,361,255 A | * | 11/1994 | Diaz et al. .................. | 370/374 |
| 5,367,643 A | * | 11/1994 | Chang et al. ................ | 395/325 |
| 5,519,704 A | * | 5/1996 | Farinacci et al. ......... | 370/85.13 |
| 5,537,142 A | * | 7/1996 | Fenouil ........................ | 348/12 |
| 5,541,927 A | * | 7/1996 | Kristol et al. .............. | 370/94.2 |
| 5,555,543 A | * | 9/1996 | Grohoski et al. ......... | 395/200.39 |
| 5,732,085 A | * | 3/1998 | Kim et al. .................. | 370/398 |
| 5,793,768 A | * | 8/1998 | Keshav ....................... | 370/400 |
| 5,959,995 A | * | 9/1999 | Wicki et al. ................ | 370/400 |

OTHER PUBLICATIONS

Y.S Yeh et al., "The Knockout Switch: A Simple, Modular Architecture For High–Performance Packet Switching" Journal on Selected Areas in Communications, Oct. 8, 1987.

Ewans J.B. et al., "Analysis and Implementation of a Priority Knockout Switch", Networking: Foundation for the Future, San Francisco, Mar. 28, 1993–Apr. 1, 1993, vol. 3, Mar. 28, 1993, Institute of Electrical and Electronics Engineers.

Eng. K.Y. et al., "Multicast and Broadcast Services in a Knockout Packet Switch", IEEE Inforcom '88, New Orleans Mar. 27–31, 1988, No. 1988, Mar. 27, 1988, Institute of Electrical and Electronics Engineers.

Goodman M. S., "Multiwavelength Networks and New Approaches to Packet Switching", IEEE Communications Magazine, vol. 27, No. 10, Oct. 1, 1989.

* cited by examiner

*Primary Examiner*—Alpus H. Hsu
(74) *Attorney, Agent, or Firm*—Baker Botts L.L.P.

(57) ABSTRACT

A novel packet switched routing architecture for establishing multiple, concurrent communications between a plurality of devices. Any number of devices are coupled to a central packet switched router via links. Due to the nature of these tightly coupled links, high data rates can be achieved between devices and the packet switched router with minimal pins. Any device can communicate to any other device via the packet switched router. The packet switched router has the capability of establishing multiple communication paths at the same time. Hence, multiple communications can occur simultaneously, thereby significantly increasing the overall system bandwidth.

19 Claims, 4 Drawing Sheets

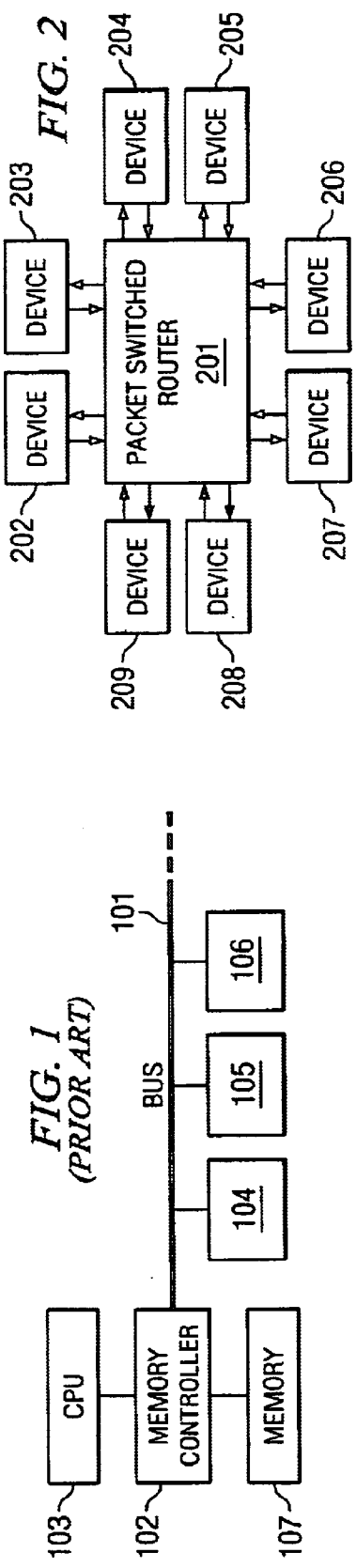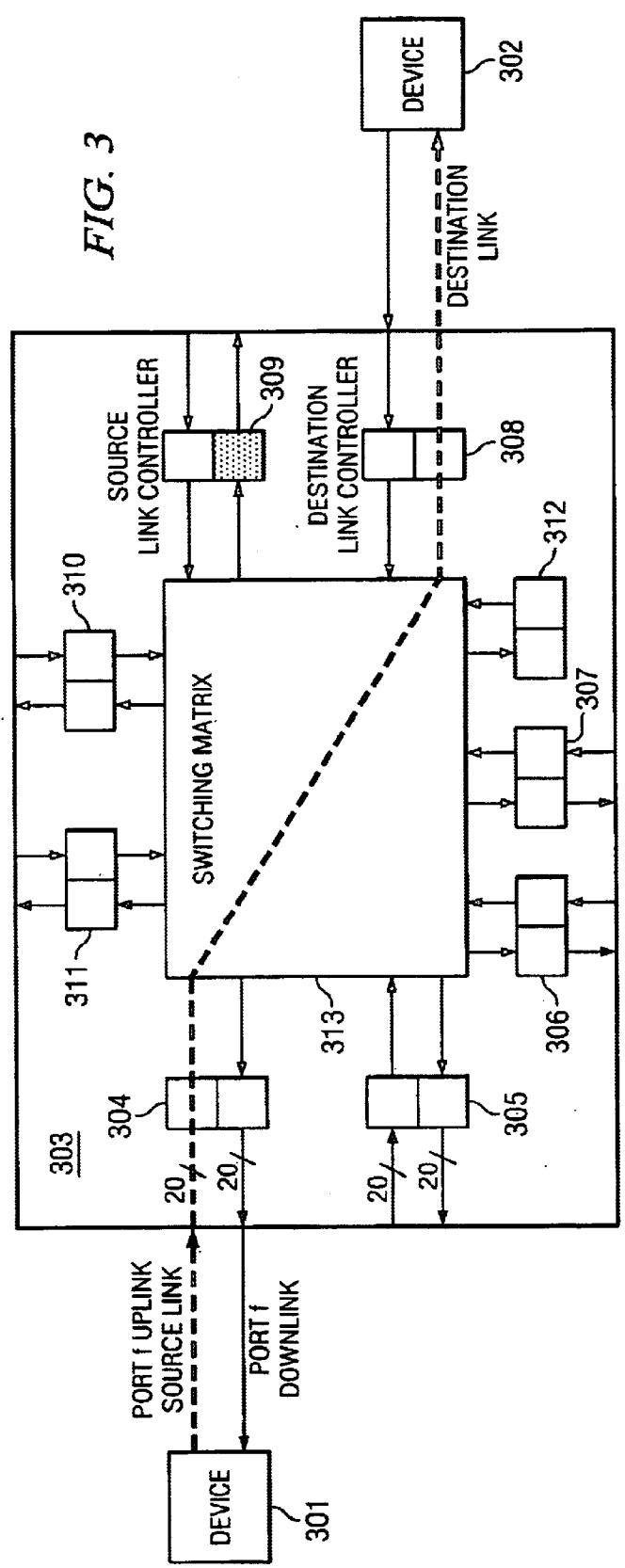

PACKET SWITCHED ROUTER ARCHITECTURE FOR PROVIDING MULTIPLE SIMULTANEOUS COMMUNICATIONS

FIELD OF THE INVENTION

The present invention pertains to a novel packet switched router architecture which provides extremely high bandwidth. More particularly, the present invention relates to a bus architecture that performs switching functions in order to allow simultaneous point-to-point communications between multiple devices of a computer system.

BACKGROUND OF THE INVENTION

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. However, today's computer systems are much more advanced, versatile, and sophisticated. Especially since the advent of digital media applications and the Internet, computers are now commonly called upon to accept and process data from a wide variety of different formats ranging from audio to video and even realistic computer-generated three-dimensional graphic images. A partial list of applications involving these digital media applications include the generation of special effects for movies, computer animation, real-time simulations, video teleconferencing, Internet-related applications, computer games, telecommuting, virtual reality, high-speed databases, real-time interactive simulations, medical diagnostic imaging, etc.

The reason behind the proliferation of digital media applications is due to the fact that much more information can be conveyed and readily comprehended with pictures and sounds rather than with text or numbers. Video, audio, and three-dimensional graphics render a computer system more user friendly, dynamic, and realistic. However, the added degree of complexity for the design of new generations of computer systems necessary for processing these digital media applications is tremendous. The ability of handling digitized audio, video, and graphics requires that vast amounts of data be processed at extremely fast speeds. An incredible amount of data must be processed every second in order to produce smooth, fluid, and realistic full-motion displays on a computer screen. Additional speed and processing power is needed in order to provide the computer system with high-fidelity stereo sound and real-time, and interactive capabilities. Otherwise, if the computer system is too slow to handle the requisite amount of data, its rendered images would tend to be small, grainy and otherwise blurry. Furthermore, movement in these images would likely be jerky and disjointed because its update rate is too slow. Sometimes, entire video frames might be dropped. Hence, speed is of the essence in designing modin, state-of-the-art computer systems.

One of the major bottlenecks in designing fast, high-performance computer systems pertains to the current bus architecture. A "bus" is comprised of a set of wires that is used to electrically interconnect the various semiconductor chips and input/output devices of the computer system. Electric signals are conducted over the bus so that the various components can communicate with each other. FIG. 1 shows a typical prior art bus architecture. Virtually all of today's computer systems use this same type of busing scheme. A single bus 101 is used to electrically interconnect the central processing unit (CPU) 103 with the memory (e.g., RAM) 107 via controller 102. Furthermore, other various devices 104–106 are also coupled to bus 101. Bus 101 is comprised of a set of physical wires which are used to convey digital data, address information for specifying the destination of the data, control signals, and timing/clock signals. For instance, CPU 103 may generate a request to retrieve certain data stored in memory 107. This read request is then sent over bus 101 to memory controller 102. Upon receipt of this read request, memory controller 102 fetches the desired data from memory 107 and sends it back over bus 101 to the CPU 103. Once the CPU is finished processing the data, it can be sent via bus 101 for output by one of the devices 104–106 (e.g., fax, modem, network controller, storage device, audio/video driver, etc.).

The major drawback to this prior art bus architecture is the fact that it is a "shared" arrangement. All of the components 102–106 share the same bus 101. They all rely on a single bus to meet their individual communication needs. However, bus 101 can only establish communications between two of these devices 102–106 at any given time. Hence, if bus 101 is currently busy transmitting signals between two of the devices (e.g., CPU 103 and device 105), then all the other devices (e.g., memory 107, device 104, and device 106) must wait their turn until that transaction is complete and bus 101 again becomes available. If a conflict arises, an arbitration circuit, usually residing in memory controller 102, resolves which of the devices 104–106 gets priority of access to bus 101. Essentially, bus 101 is analogous to a telephone "party" line, whereby only one conversation can take place amongst a host of different handsets serviced by the party line. If the party line is currently busy, one must wait until the prior parties hang up, before one can initiate their own call.

In the past, this type of bus architecture offered a simple, efficient, and cost-effective method of transmitting data. For a time, it was also sufficient to handle the trickle of data flowing between the various devices residing within the computer system. However, as the demand for increased amounts of data skyrocketed, designers had to find ways to improve the speed at which bits of data can be conveyed (i.e., increased "bandwidth") over the bus. One temporary solution was to increase the width of the bus by adding more wires. The effect is analogous to replacing a two-lane road with a ten-lane super freeway. However, the increase in bus width consumes valuable space on an already densely packed and overcrowded printed circuit board. Furthermore, each of the semiconductor chips connected to the bus must have an equivalent amount of pins to match the increased bus width for accepting and outputting its signals. These additional pins significantly increase the size of the chips. It becomes more difficult to fit these chips onto the printed circuit boards. Furthermore, the practical limitation for cost effective chips and packages impose a physical restriction on the chip's overall size and its number of pins. Today's buses are typically limited to being 64-bits wide. In other words, 64 bits of data or address can be sent simultaneously in parallel over 64 separate wires. The next step of increasing the bus width to 128 bits wide has become impractical.

Another temporary solution to the bandwidth problem was to increase the rate (i.e., frequency) at which data is sent over the bus. However, the physics associated with implementing long sets of parallel wires with multiple loads produces a wide range of problems such as impedance, mismatches, reflections, crosstalk, noise, non-linearities; attenuations, distortions, timing, etc. These problems become even more severe as the frequency increases. It has come to a point where the highest attainable frequency is approximately 33–50 MHz. Higher frequencies cannot be attained without fine tuning, extremely tight tolerances, exotic micro-strip layouts, and extensive testing. It is extremely difficult to reliably mass produce such high frequency computers.

Given a 64-bit bus running at 50 MHz, the highest attainable data rate for a typical computer system is 400 Mbytes per second. Although this data rate appears to be quite impressive, it is nevertheless fast becoming insufficient to meet the demands imposed by tomorrow's new applications. Thus, there is a great need for some type of bus scheme that provides increased throughput. The present invention offers a unique solution to this problem by providing a novel bus architecture that has a bandwidth which is many times greater than that of typical prior art buses. Furthermore, the bus architecture of the present invention is reliable, cost-effective, and extremely efficient. One fundamental difference is that rather than having a shared bus arrangement, the present invention utilizes a packet switched interconnect scheme whereby multiple packets can be sent concurrently by various devices to different destinations. Hence, the bandwidth associated with the packet switched routing architecture of the present invention is significantly greater because multiple high-speed packet transmissions can occur simultaneously.

SUMMARY OF THE INVENTION

The present invention pertains to a novel architecture for establishing multiple, concurrent communications between a plurality of devices. Any number of devices are connected to individual ports of a central packet switched router. Due to the nature of the link between the device and the packet switched routed, very high data rates can be achieved with minimal number of pins. Devices communicate with each other by sending data packets from the originating device to the destination device. Any device can communicate with any other device through the packet switched router. The packet switched router has the capability of simultaneously routing a plurality of packets from a plurality of originating devices to a plurality of destination devices. Hence, multiple high-speed data communications can occur simultaneously, thereby significantly increasing the overall system bandwidth.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows a typical prior art bus architecture.

FIG. 2 shows a block diagram of one embodiment of the bus architecture according to the present invention.

FIG. 3 shows a more detailed diagram of the fundamental blocks associated with the packet switched router.

DETAILED DESCRIPTION

Figure 4:
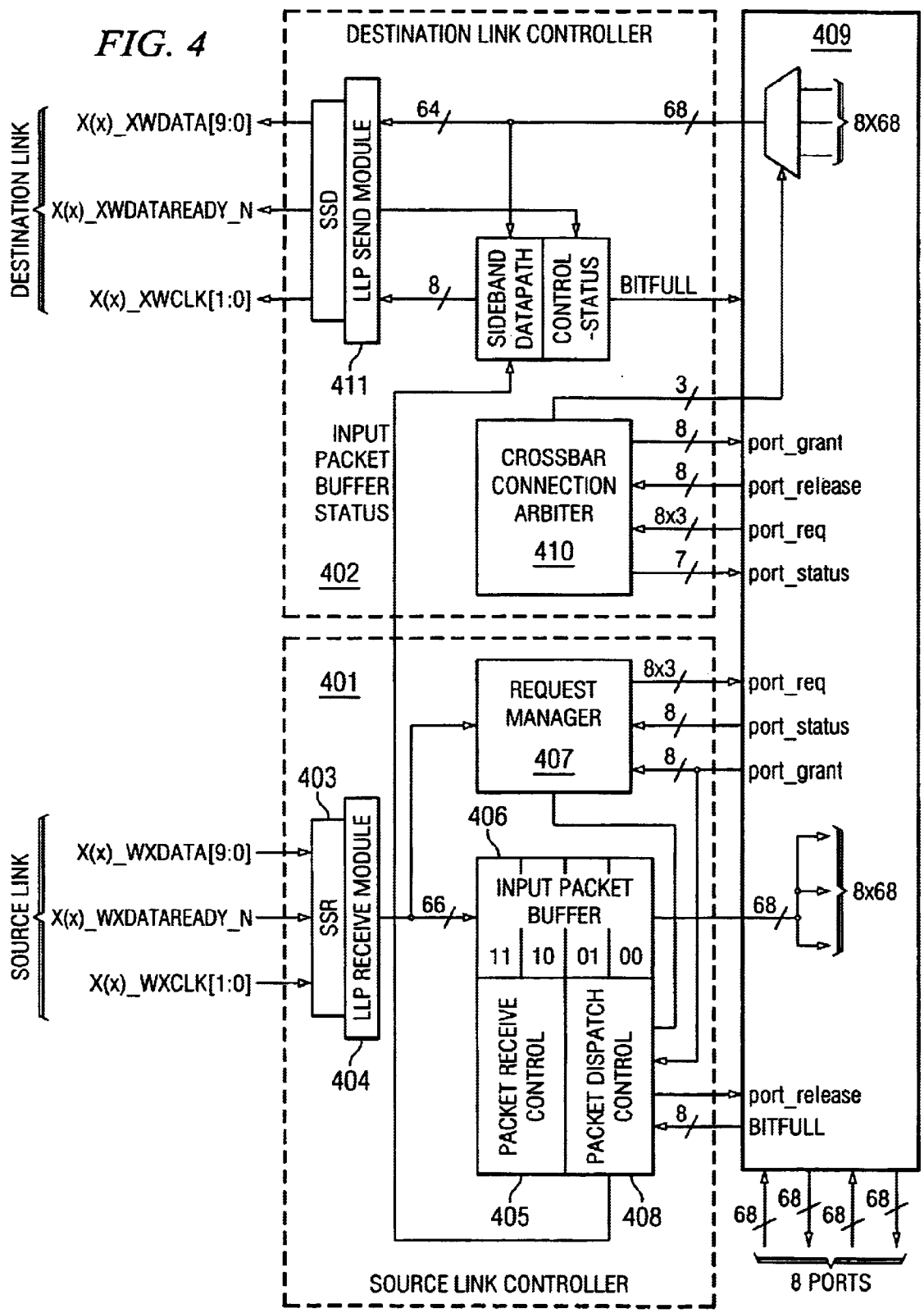
FIG. 4 shows a detailed circuit diagram of a link controller.

The present invention of a novel packet switched router architecture having extremely high bandwidth is described. The novel packet switched router architecture utilizes a central packet switched router to select and establish multiple links between various components of a computer system, whereby multiple high-speed communications can occur simultaneously over these separate links. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

FIG. 2 shows a block diagram of one embodiment of the packet switched router architecture according to the present invention. Multiple devices 202–209 are connected to a central packet switched router 201. Devices 202–209 may include subsystems (e.g., graphics, audio, video, memory, etc.), printed circuit boards, single semiconductor chips or chipsets (e.g., RAM, ASICs, CPU's, DSP's, etc.), and various other components (e.g., I/O devices, bridges, controllers, interfaces, PCI devices, etc.). Each of the devices 202–209 has its own dedicated transceiver for transmitting and receiving digital data. Eight such devices 202–209 are shown. Also as shown, packet switched router 201 has eight ports for interfacing with each of the eight devices 202–209. In the present embodiment, each port has the ability to operate as either a 16-bit or 8-bit port. However ports may be wider than 16 bits or narrower than 8 bits. Each port uses two links: one for transmit (source link) and one to receive (destination link). However, the system is scalable so that it can handle more or less devices. By adding more ports, additional devices may be incorporated into the computer system via the packet switched router 201. Each of these devices 202–209 has its own dedicated link. A link is defined as the physical connection from the packet switched router 201 to any of the devices 202–209. A link may be uni-directional or bi-directional. However, the currently preferred embodiment entails implementing point-to-point uni-directional connections in order to provide a controlled impedance transmission line. The data rate on each link is 400 MHz (2 bytes*400 MHz=800 megabytes per second in each direction=1.6 gigabytes per second per port).

Switched packet router 201 can be commanded to establish a link between any two designated devices. Thereupon, a source device may transmit its packet of data to the destination device via the link. Immediately after the packet is sent, a new link may be established and the source device may initiate transfer of another packet to a different destination device. Concurrently, a different source device may transmit its data packet over a separate link to its intended destination device. For example, device 202 can be linked to device 203. Device 202 transmits a packet to device 203. Later, packet switched router 201 can be commanded to establish a dedicated link between device 202 and device 203. A packet can then be transmitted from device 202 to 203. Basically, device 202 is capable of being linked to any of the other devices 203–209 coupled to packet switched router 201. In the present invention, one or more links may be established at any given time. For instance, a first link may be established between devices 202 and 209 while, simultaneously, a second link may be established between devices 203 and 205. Thereby, device 202 may transmit a packet to device 209. At the same time, device 203 may transmit its packet to device 205. With eight devices, there may be up to four separate packet transmissions going at the same time. An additional 1.6 Gigabytes per second of bandwidth is achieved simply by establishing a second link. Hence, with the present invention, bandwidth is increased to the desired degree merely by establishing additional links. Thus, instead of having a shared bus scheme with only one communication over a shared party line, the present invention utilizes a packet switched routing architecture to establish multiple links so that multiple data packets can be conveyed concurrently.

FIG. 3 shows a more, detailed diagram of the fundamental blocks associated with the packet switched router. The currently preferred implementation of the architecture employs a high-speed, packet-switched protocol. A packet of data refers to a minimum unit of data transfer over one of the links. Packets can be one of several fixed sizes ranging from a double word (i.e., 8 bytes) to a full cache line (i.e., 128 bytes) plus a header. The data packets are transmitted source synchronous (i.e., the clock signal is sent with the data) at rates of up to 800 Mbytes/sec for 16-bit links and up to 400 Mbytes/sec for 8-bit links. Split transactions are used to transmit data, whereby an initiator device 301 sends a request packet (e.g., read command or write command plus data) to a target device 302 which then replies with a response packet (e.g., read data or optionally a write acknowledgment). The packet switched router 303 performs the functions of a switching matrix. The device 301 desiring to transfer a packet to another device 302, first transfers the packet to its associated input packet buffer. Once the packet routing information has been correctly received, arbitration begins for the destination port resource 308. The packet is then stored until the corresponding source link controller 304 can successfully obtain access to the destination port resource 308. As soon as access is granted, the packet is transferred through the switching matrix 313 to the destination port resource 308, and is subsequently transferred to target device 302.

Hence, the major functional blocks corresponding to the packet switched router 303 include link controllers 304–311, an internal interface 312, and the switching matrix 313. The link controllers 304–311 handle all packet transfers on the link port between a device and the packet switched router. The link controllers 304–311 are comprised of two sub-blocks: the source link controller and the destination link controller. The source link controller controls all packet movement from a source link to the internal switched router 313. Conversely, a destination link controller controls all packet movement from the packet switched router to the destination link. The switched router 313 is a nine port switch which connects the source link controllers to the destination link controllers. Additionally, one port on the switched router 313 is reserved for the internal interface 312. Internal interface 312 contains the interface to all registers internal to the packet switched router 303 and also functions in conjunction with the link controllers during error handling. Each of these major blocks are described in detail below.

FIG. 4 shows a detailed circuit diagram of a link controller. The link controller is divided into two sections, a source link controller 401 and a destination link controller 402. The source link controller 401 handles all traffic between the source link and the switching matrix 403. Packets are transferred on the source link and the data is received by the source synchronous receiver (SSR) 403 and link level protocol (LLP) receive module 404. The data is transferred in micropackets to ensure error-free transmission. Each micropacket contains 128 bits of data, 16 check bits, 4 bits of transmit sequence number, 4 bits of receive sequence number, and 8 bits of sideband information. The SSR 403 receives the narrow, 400 MHz data stream and transmitted clock. It uses the clock signal to convert the data stream back into a wide, 100 MHz data stream. Hence, the majority of the packet switched router logic is isolated from the high speed links and operates at a 100 MHz core clock frequency. The LLP module regenerates the error check bits from the received data and compares them to the received check bits to ensure that no errors have occurred. The function of the LLP receive module 404 is to isolate the upper levels of logic in the link controller from the link level protocol. Basically, the SSR 403 and LLP receiver module 404 strips all link protocol information and passes the data to the next stages of logic.

Next, the packet receive control logic 405 scans the sideband data for a "start of packet" code. If this code is received, the control logic 405 begins filling one of the 4-input packet buffers 406. The input packet buffers 406 serve two purposes. First, it provides a place to temporarily store a packet when the packet destination is busy. And second, it provides for rate matching between the data stream coming from the LLP and the switching matrix. The packet receive control logic 405 also extracts pertinent information from the command word portions of the packet and places it in the request queue, which is located in the request manager 407. The information written into the request queue defines the packet's destination, priority, and type (i.e., request or response). It is the task of the request manager to determine which packets are eligible for arbitration. While the packet is being received and put into one of the input packet buffers 406, the request manager 407 checks the status of the destination port and the priority of the packets in the queue to determine which of the packets in the input packet buffer 406 has the highest priority. If the packet which has just entered the queue has the highest priority of all packets currently in the queue, it will advance to the front of the queue and enter the arbitration phase. If there are higher priority connection requests already in the queue, it waits until those requests are serviced.

During the arbitration phase, the request manager 407 sends a connection request (port_req) to the destination link controller associated with that packet's destination. The request manager 407 then alerts the packet dispatch control 408 that a connection arbitration is in progress. When the packet wins arbitration, a port_grant signal is sent back from the destination link controller to the requesting source. Whereupon, the dispatch controller 408 begins transferring the packet out of the input packet buffer 406 and into the switching matrix 409. The request manager 407 then retires the entry from the request queue. As the dispatch controller 408 is transferring the packet, it also monitors whether the destination can currently accept any more data. When the transfer of the packet nears completion, the dispatch controller 408 releases control of the destination port by asserting the port_release signal. This releases the connection arbiter 410 to start a new arbitration phase and establish a new connection.

Referring still to FIG. 4, the destination link controller 402 handles all packet traffic between the switching matrix and the destination link. In addition, it controls all access to the destination port via the connection arbiter 410. The connection arbiter 410 is responsible for selecting from among all the source link controllers requesting to establish a connection to its destination port. The arbiter 410 scans all current port_req signals and sends a port_gant signal back to the selected link source controller. It then updates the status of the destination port (port_status). As the port_ grant acknowledge is sent, the connection arbiter 410 also schedules switching the switching matrix to coincide with the first data arriving at the destination port from the source link controller. A new arbitration cycle begins when the arbiter 410 receives a port_release signal from the source link controller.

Data is streamed directly from the switching matrix to the LLP Send Module 411. The LLP Send Module 411 contains an internal buffer which is used to perform two functions. First, a portion of this buffer is used for supporting the LLP sliding window protocol. As data is transferred over the link, it is also written into the buffer. If receipt of the data is acknowledged by the receiver, the buffer locations are cleared. However, if an acknowledgment is not received, the data is retransmitted. In normal operation with packets being received correctly, only a portion of the buffer is used to support this protocol. Second, the remaining location in the buffer is used to rate match between the 800 Mbyte/sec switching matrix 409 and the 400 Mbyte/sec 8-bit links. This buffering allows a 16-bit source link controller or an 8-bit source link controller that has accumulated a full packet, to transfer at the full data rate to an 8-bit destination link. Thereby, the source link controller can then go service another destination while the transfer on the destination link is occurring.

A description of the internal interface is now presented. All access to internal registers in the packet switched router is performed via this internal interface. Devices requesting to modify these registers should direct their request packets to the internal interface destination. The internal interface functions much the same way as any set of link controllers. Source link controllers desiring to connect to the internal interface send a connection request to the internal interface. The arbiter within the internal interface sends an acknowledgment and then receives the packet. After the internal interface has received the packet it performs the appropriate operations on the packet switched router registers. If a response is required, the internal interface forms a response packet and transfers it back to the initiating device via the switching matrix.

Figure 5:
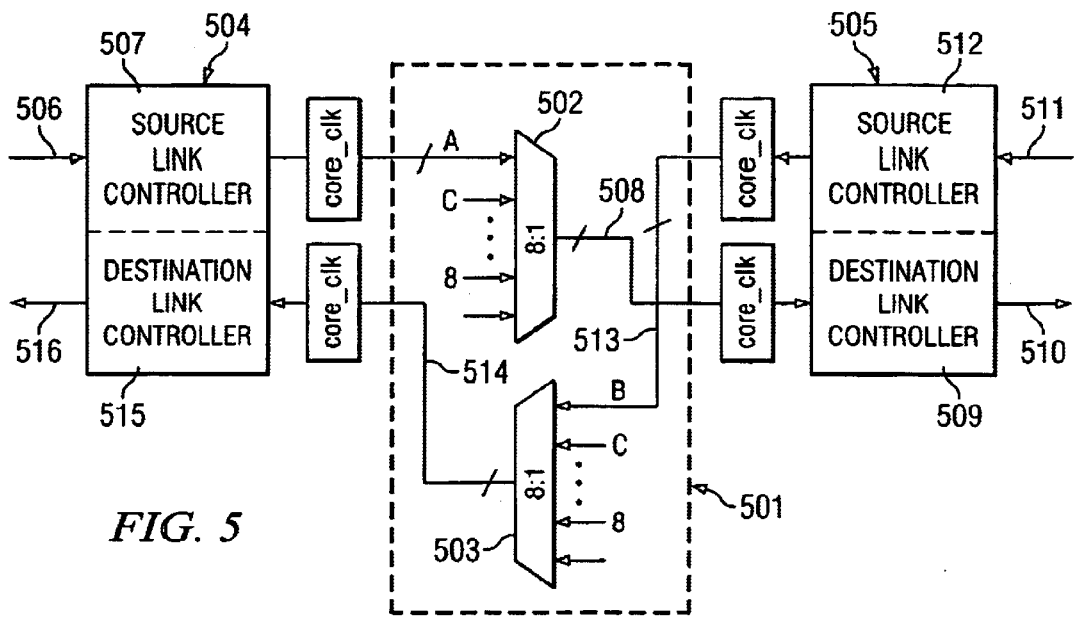
FIG. 5 shows the currently preferred embodiment for the switching matrix.

There are many different circuit designs which may be used to implement the switching matrix. The currently preferred embodiment for the switching matrix is shown in FIG. 5. The switching matrix 501 is comprised of nine 68-bit wide 8:1 multiplexers. Any of the source ports can be connected concurrently to any of the destination ports. The switch interconnect is traversed by data in one core clock cycle. Hence, it is necessary for source link controllers to drive the switching matrix with registered outputs and for the destination link controllers to register the data in. For purposes of illustration, a pair of these multiplexers 502 and 503 are shown for connecting a first link controller 504 to a second link controller 505. Data received on link 506 is passed through the source link controller 507 and input to multiplexer 502. Multiplexer 502 is commanded to select the appropriate input line to be connected to the output line 508. This causes the data to eventually be input to the destination link controller 509 and out to a port on link 510. Likewise, data on link 511 is input to the source link controller 512. The data is then processed by the source link controller 512 and sent as a input on line 513 to multiplexer 503. Multiplexer 503 is commanded to select the appropriate input lines 513 and establish a connection to the appropriate lines 514 for input to the destination link controller 515. Thereby, the destination link controller 515 processes the received data and sends it out to the destination port via link 516. It should be noted that multiple sets of inputs from each of link controllers are input to each of the nine multiplexers. Thereby, each multiplexer can select which of these multiple inputs is to be connected to its destination link.

Figure 6:
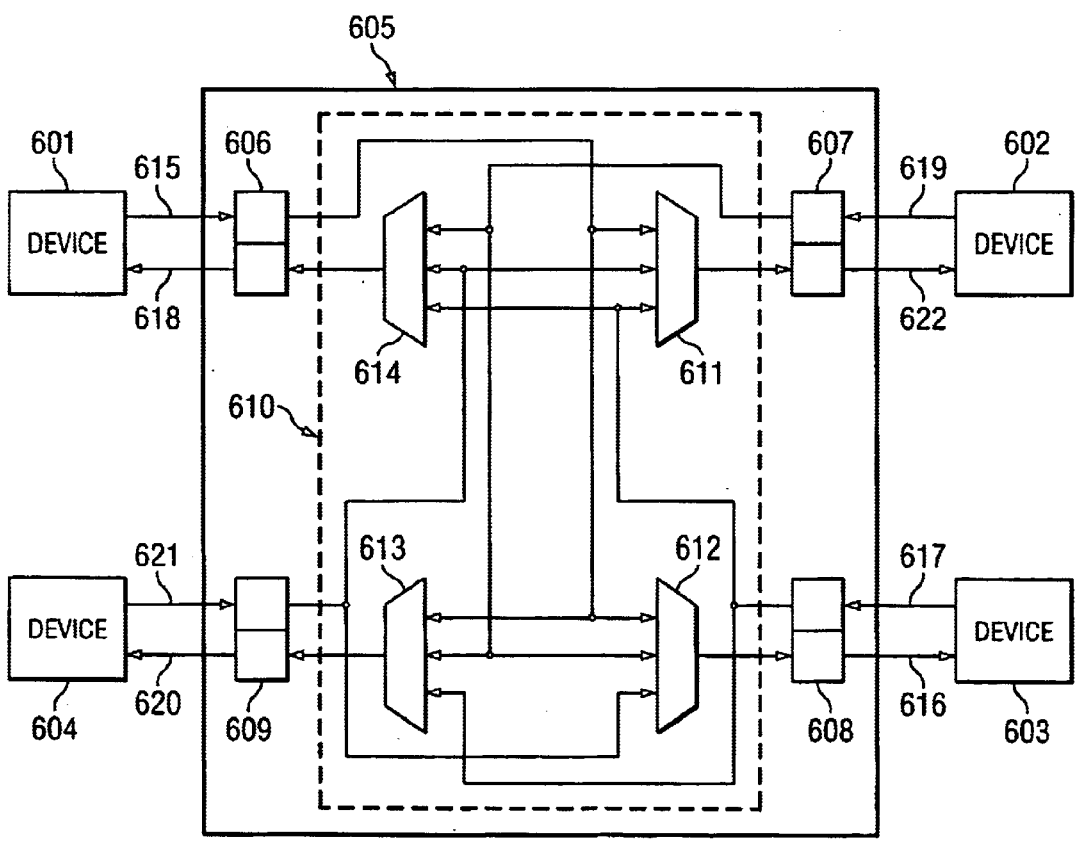
FIG. 6 shows an exemplary switched circuit for providing concurrent communications.

FIG. 6 shows an exemplary switched circuit for providing concurrent communications. Four separate devices 601–604 are coupled to the packet switched router 605 through four pairs of links. Switched packet router 605 is comprised of four link controllers 606–609 and switching matrix 610. Switching matrix 610 is comprised of four multiplexers 611–614. Each of the multiplexers 611–614 accepts inputs from three source links and outputs to one destination link. These multiplexers can be commanded so that connections may be established from one particular device to any of the other three devices. For example, the output link from device 601 can be connected to destination device 602 via multiplexer 611; destination device 603 via multiplexer 612; or destination device 604 via multiplexer 613. Likewise, the output link from device 603 can be connected to destination device 601 via multiplexer 614; destination device 602 via multiplexer 611; or destination device 604 via multiplexer 613.

In addition, pathways may be established to provide multiple concurrent packet transmissions. For example, device 602 may be connected to device 604 via multiplexor 613. And device 603 may be connected to device 601 via multiplexor 614. Thereby three separate packets of data may be transmitted concurrently: packet1 from source device 601 to destination device 602, packet2 from source device 602 to destination device 604, and packet3 from source device 603 to destination device 601. In an alternative embodiment, connections may be established between a single source device and multiple destination devices. For example, device 601 may transmit data to both devices 603 and 604 simultaneously. Conversely, source devices 602, 603, and 604 may all send packets to 601. Arbitration is accomplished at link controller 606 for the multiple sources sending to device 601. Of course, the circuit can be scaled to accommodate additional devices by adding more links, link controllers, and multiplexers.

Figure 7:
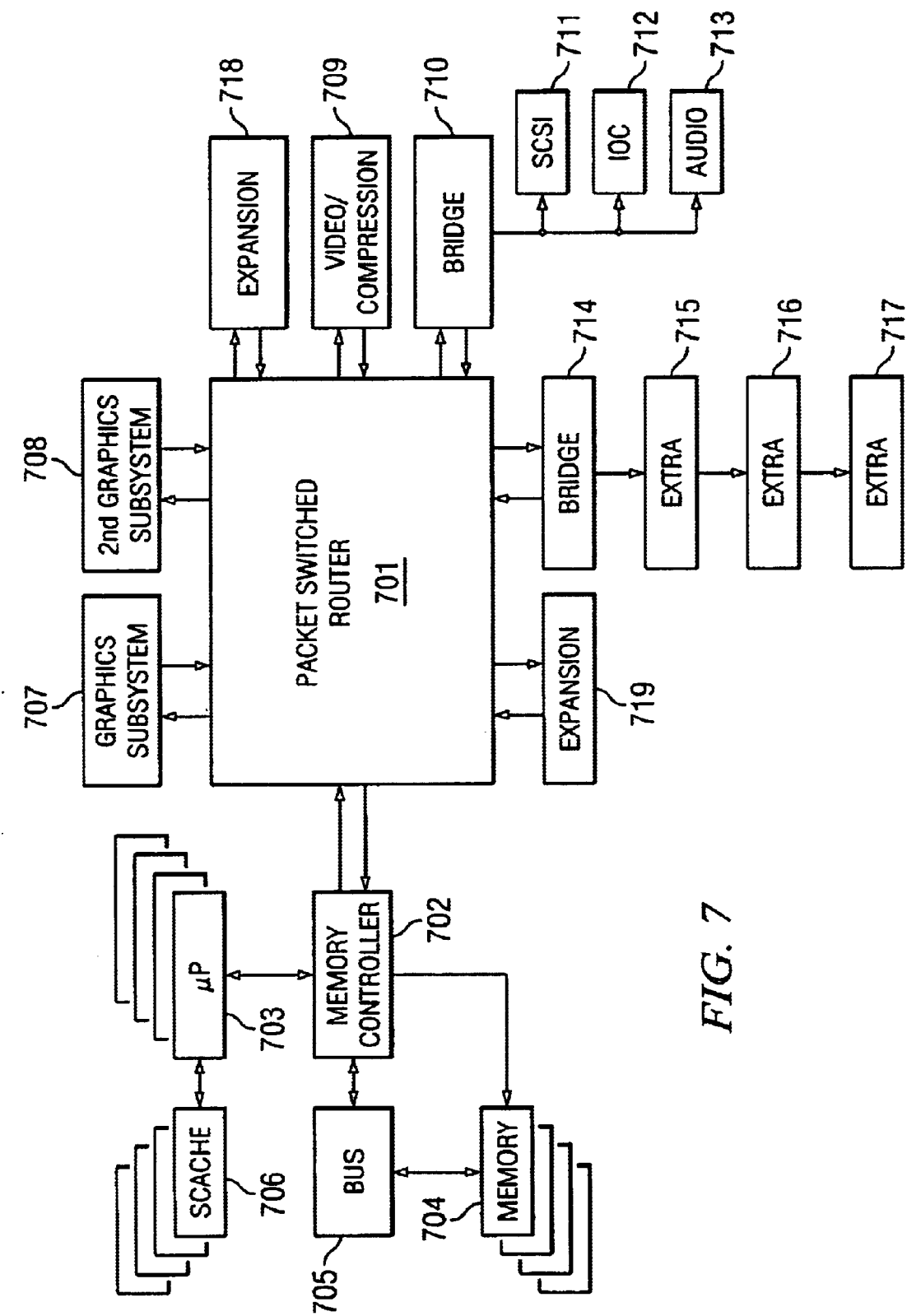
FIG. 7 shows an exemplary computer system upon which the present invention may be practiced.

There are many different computer system configurations to which the packet switched router architecture of the present invention may be applied. One such exemplary computer system is shown in FIG. 7. Switched packet router 701 has a pair of direct point-to-point connections to memory controller 702. Memory controller 702 facilitates the transfer of data between one or more microprocessors 703 and main memory 704. A high-speed (e.g., 1 GBytes/sec) memory bus 705 is used to couple memory controller 702 with the actual main memory 704. To improve performance, the microprocessors 703 may temporarily cache data in the cache 706. Other devices which may be connected to packet switched router 701 include one or more graphics subsystems 707–708. The graphics subsystems 707–708 perform functions such as scan conversion, texturing, anti-aliasing, etc. Furthermore, a video board 709 having compression/decompression capabilities can be connected to packet switched router 701. A bridge device 710 may also be connected to packet switched router 701. The bridge 710 acts as an interface so that various off-the-shelf PCI devices (e.g., graphics controller, modems, disk controller, etc.) may be coupled to the computer system via standard SCSI 711, IOC 712 and audio 713 ports. A second bridge 714 may be added to provide expansion PCI slots 715–717. Ports 718 and 719 are used to provide future growth and upgradeability for the computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for transmitting multiple data transmissions concurrently between a plurality of devices within a computer system, comprising:

a first device housed within the computer system having a dedicated first source link for transmitting packet data by the first device and a dedicated first destination link for receiving packet data by the first device, wherein the dedicated first source link and the dedicated first destination link comprise a first pair of point-to-point uni-directional communication paths;

a second device housed within the computer system having a dedicated second source link for transmitting packet data by the second device and a dedicated second destination link for receiving packet data by the second device, wherein the dedicated second source link and the dedicated second destination link comprise a second pair of point-to-point uni-directional communication paths;

a third device housed within the computer system having a dedicated third source link for transmitting packet data by the third device and a dedicated third destination link for receiving packet data by the third device, wherein the dedicated third source link and the dedicated third destination link comprise a third pair of point-to-point uni-directional communication paths;

a packet switched router housed within the computer system to which the first, second, and third source links and the first, second, and third destination links are coupled, wherein the packet switched router enables packet data to be transmitted from the first device to the second device while packet data is transmitted from the second device to the third device and while packet data is transmitted from the third device to the first device through the first, second, and third pair of point-to-point uni-directional communication paths, the packet switched router operable to determine whether packet data has been successfully received at a destination device, the packet switched router operable to resend packet data in response to packet data not being received at a destination device, the packet switched router including an internal buffer to hold packet data for resending, the internal buffer also operable to perform rate matching for proper packet data output.

2. The apparatus of claim 1, wherein data transmission are comprised of packets of digital bits of a fixed length including data bits, error correction bits, and information bits.

3. The apparatus of claim 1, wherein the packet switched router includes a link controller corresponding to each of the first, second, and third devices for interfacing packet data transmissions between one of the links and the packet switched router.

4. The apparatus of claim 1, wherein the packet switched router includes a switching circuit comprised of a plurality of multiplexers having multiple inputs for accepting data from source links and an output to one of the destination links to one of the devices.

5. The apparatus of claim 4, wherein the switching circuit includes an interface circuit for controlling the plurality of multiplexers.

6. The apparatus of claim 1, wherein the packet switched router includes a memory for temporarily storing packet data if its intended destination is currently busy.

7. The apparatus of claim 1, wherein the first device is capable of establishing a communications link with either the second or third device, the second device is capable of establishing a communications link with either the first or third device, and the third device is capable of establishing a communications link with either the first or second device.

8. The apparatus of claim 1, further comprising an arbitration circuit for arbitrating packets received by the third device when the packet switch router enables both the first and the second device to transmit data to the third device.

9. A packet switched router residing within a computer for establishing communication between a plurality of devices residing within the computer, wherein at least two concurrent communications can be conveyed through the packet switched router amongst the devices, the packet switched router comprising:

a plurality of connections coupling to the plurality of devices;

a plurality of switches for routing a packet of data from a source device to a destination device by establishing a communication path from the source device to the destination device and subsequently switching the communication path to a different destination device for a subsequent data packet, wherein the plurality of switches can establish a plurality of communication paths simultaneously so that multiple communications can occur at the same time between a plurality of the devices;

interface circuitry operable to determine whether packet data has been successfully received at the destination device, the interface circuitry operable to resend packet data via an internal buffer in response to packet data not being received at the destination device, the interface circuitry operable to rate match packet data for proper output using the internal buffer.

10. The packet switched router of claim 9, wherein the plurality of communication paths are point-to-point connections.

11. The packet switched router of claim 9, further comprising a link controller corresponding to each of the plurality of devices for moving packets of data between the devices and the plurality of switches.

12. The packet switched router of claim 11, wherein the link controller converts a first frequency of received data to a second frequency, wherein the second frequency is less than the first frequency.

13. The packet switched router of claim 9, wherein the plurality of switches are comprised of a plurality of multiplexers having multiple inputs for accepting data from the plurality of devices coupled to the packet switched router and selecting one of the inputs for output to one of the devices coupled to the packet switched router.

14. The packet switched router of claim 9 further comprising a memory for temporarily storing data if its intended destination is currently busy.

15. In a computer system, a method for transmitting multiple packets between a plurality of devices within the computer system so that multiple communications can occur concurrently between a plurality of selected devices, comprising the steps of:

identifying a first device, a second device, and a third device residing within the computer system;

transmitting packetized data from the first device, second device, and the third device to a packet switched router through dedicated source and destination links which form pairs of point-to-point uni-directional data paths, wherein the packet switched router resides within the computer system;

transmitting packetized data from the first device to the second device, via the packet switched router, while the second device is transmitting packetized data to the third device;

determining, at the packet switched router, whether packet data has been successfully received at a destination device;

resending packet data from an internal buffer of the packet switched router in response to packet data not being received at the destination device;

rate matching packet data at the internal buffer for proper output.

16. The method of claim 15, further comprising the step of commanding the packet switched router to establish a new connection between the third device and either the first device or the second device.

17. The method of claim 15 further comprising the step of commanding a plurality of multiplexers having multiple inputs for accepting data from a plurality of the devices and selecting one of the inputs for output to one of the devices.

18. The apparatus of claim 15, further comprising transmitting data to the first device from the third device while the first device is transmitting data to the second device and the second device is transmitting data to the third device.

19. The method of claim 15 further comprising the step of arbitrating packets sent to the third device by the first device and the second device.

* * * * *

UNITED STATES PATENT AND TRADEMARK OFFICE
CERTIFICATE OF CORRECTION

PATENT NO. : 6,683,876 B1
DATED : January 27, 2004
INVENTOR(S) : James E. Tornes et al.

It is certified that error appears in the above-identified patent and that said Letters Patent is hereby corrected as shown below:

<u>Title page,</u>
Item [73], Assignee, after "Mountain" delete "view" and insert -- View --.

Signed and Sealed this

Twenty-ninth Day of June, 2004

JON W. DUDAS
*Acting Director of the United States Patent and Trademark Office*